(12) United States Patent
Greiwe et al.

(10) Patent No.: US 7,637,205 B2
(45) Date of Patent: *Dec. 29, 2009

(54) DISPENSING DEVICE FOR DRINKS

(75) Inventors: Hansdieter Greiwe, Boxberg (DE); Rainer Herrmann, Lauda-Königshofen (DE)

(73) Assignee: Niro-Plan AG, Aarburg (CH)

( * ) Notice: Subject to any disclaimer, the term of this patent is extended or adjusted under 35 U.S.C. 154(b) by 456 days.

This patent is subject to a terminal disclaimer.

(21) Appl. No.: 10/525,620

(22) PCT Filed: Aug. 28, 2003

(86) PCT No.: PCT/EP03/09556

§ 371 (c)(1),
(2), (4) Date: Oct. 31, 2005

(87) PCT Pub. No.: WO2004/024615

PCT Pub. Date: Mar. 25, 2004

(65) Prior Publication Data

US 2006/0123994 A1 Jun. 15, 2006

(30) Foreign Application Priority Data

Aug. 28, 2002 (DE) ................. 102 39 593

(51) Int. Cl.
*A47J 31/00* (2006.01)
(52) U.S. Cl. .............. 99/280; 99/291; 99/293; 99/299; 141/298; 141/279; 141/284
(58) Field of Classification Search .......... 99/275, 99/279–323, 485; 426/231–233, 388, 433; 700/239–242; 222/129.1, 129.4, 23–39; 141/198, 369, 266, 284
See application file for complete search history.

(56) References Cited

U.S. PATENT DOCUMENTS

| 3,076,404 | A | * | 2/1963 | Manaresi | ............ 99/287 |
| 3,872,781 | A | * | 3/1975 | Helbling | ............ 99/282 |
| 4,202,387 | A |   | 5/1980 | Upton    |                    |
| 4,207,809 | A | * | 6/1980 | Brill    | ............ 99/279 |

(Continued)

FOREIGN PATENT DOCUMENTS

DE 19948366 A1 * 12/2000

(Continued)

*Primary Examiner*—Timothy F. Simone
(74) *Attorney, Agent, or Firm*—Merchant & Gould P.C.

(57) ABSTRACT

The invention relates to dispensing devices for drinks or similar dosable liquid foodstuffs, e.g. coffee, milk or soft drinks, comprising manually actuatable selector switches for determining the type and quantity of the foodstuff to be dispensed. The aim of the invention is to simplify the use of one such dispensing device. To this end, said device is provided with an identification device for identifying different types of containers for receiving the foodstuff with subsequent consumption from the container, and for emitting an identification signal describing the container. The dispensing device is also provided with a valve device which, on the basis of the identification signal, connects at least one of a plurality of supply devices for supplying a defined foodstuff or a mixture of defined foodstuffs by means of a filling device, and fills the container with a predetermined quantity of the defined foodstuff or the mixture thereof. Said arrangement enables the customer to determine the amount of foodstuff to be contained in the container, by the selection of the container, thus simplifying the operation of the dispensing device.

7 Claims, 1 Drawing Sheet

U.S. PATENT DOCUMENTS

| | | | |
|---|---|---|---|
| 4,550,652 A * | 11/1985 | Da Silva | 99/279 |
| 4,572,253 A | 2/1986 | Farmer et al. | |
| 4,579,048 A * | 4/1986 | Stover | 99/280 |
| 4,745,852 A | 5/1988 | Sager | |
| 5,158,793 A | 10/1992 | Helbling | |
| 7,353,850 B2 * | 4/2008 | Greiwe et al. | 141/279 |

FOREIGN PATENT DOCUMENTS

| | | |
|---|---|---|
| EP | 0 972 481 A | 2/2000 |
| WO | 01/17893 A2 | 3/2001 |
| WO | WO 2004023949 A1 * | 3/2004 |

* cited by examiner

DISPENSING DEVICE FOR DRINKS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a dispensing device for drinks or similar dosable liquid foodstuffs, in particular for coffee, milk, soft drinks or soups.

BACKGROUND OF THE INVENTION

Dispensing devices of the kind described above are known in diverse forms. In particular in self-service restaurants or canteens, the customers can collect their drinks or soups from the "automat" themselves, by taking a container from the supply cabinet, placing it under a filling outlet, and then actuating a button that identifies the desired drink. However, this procedure involves certain disadvantages, which particularly during especially busy periods such as midday in a highway rest stop, cause considerable delays and unpleasantness for both the customer and the person responsible for the apparatus.

For one thing, it often happens that the customer does not begin to think about which drink he really wants until he is standing in front of the dispensing device. Another person who decides more quickly cannot "get around" the hesitant one, because the latter has already placed his cup or glass under the filling outlet; hence the next customer must simply wait until the hesitant customer has finally reached a decision.

Furthermore, if a customer has chosen the wrong kind of container, e.g. an espresso cup, and now pushes the button for "cappuccino", the inevitable consequence is an "overflow catastrophe", which—and this surely hardly requires an explanation—is just as unpleasant for the customer as it is for the manager of the rest stop.

The various drinks or soups obtainable from a dispensing device can be represented to only a limited extent on the switches provided there for choosing among them. In particular, it is very difficult to represent their amounts, e.g. a small cup of espresso as opposed to a "mug" of coffee. The customer who puts a large cup under the outlet and, after activating a button, finds it filled only with an espresso is disappointed.

Starting from the state of the art as described above, it is the object of the present invention to provide a dispensing device for drinks or similar dosable liquid foodstuffs that improves and facilitates usability in a simple manner.

BRIEF SUMMARY OF THE INVENTION

According to the present invention there is provided a dispensing device for drinks or similar dosable liquid foodstuffs, in particular for coffee, milk, soft drinks and/or soups, comprising a plurality of supply means for supplying a specific foodstuff or a mixture of specific foodstuffs; a filling mechanism for filling a container with a predetermined amount of a specified foodstuff or mixture of foodstuffs; an identification means comprising at least one sensor for detecting at least one of shape characteristics and weight of containers that differ from one another but that are all designed to be filled with a foodstuff for subsequent consumption from the container, and adapted to send out an identification signal that specifies the particular container detected; and a valve mechanism adapted such that in response to the identification signal it puts at least one of the supply means in communication with the filling mechanism so that the container can be filled with a predetermined amount of the specified foodstuff or mixture of foodstuffs.

The aim of the invention resides in the fact the choice of the foodstuff is already made when the container is chosen and removed from the storage cabinet by the customer. Since the container is always filled with the same foodstuff, no overflow catastrophe can occur, because not only the nature but also the amount of the foodstuff that is dispensed is determined by the container itself. Furthermore, indecisive customers do not get in the way of others because they cannot block access to the dispensing device, so impoliteness is eliminated. Because the shape characteristics and/or the weight of the container or a combination of these two measured values is obtained, no separate identification means (for example, barcode strips or the like) need be provided. Hence the manager of the rest stop can continue to use the containers already available, and need not change them.

Examples of shape characteristics that can be used for identifying the container include the maximal height and maximal width of the container or special configurations, for instance the different shapes of an espresso cup or a coffee mug. Much the same applies to the weight characteristics of the container. However, the combination of the characteristics "shape" and "weight" is especially advantageous, because it ensures greater reliability of the identification.

Finally, it is also very much simpler for the foodstuff to be represented on the container, by a verbal description and a picture, so that the customer receives this information from the chosen container. Then when he places a soup dish in the dispensing device, it cannot happen that he receives milky coffee instead.

Preferably the identification means comprises a programmable memory in which, for each of the various identification signals, are stored quantity signals and/or choice signals for specification of the corresponding foodstuff. Such memories can be economically obtained and programmed.

It is particularly preferred for the identification means additionally to comprise a reading means for reading information attached to the container; this reading process can be optical (e.g., by way of a barcode) or electromagnetic (e.g., by way of a transponder or magnetic strip). In this case even identically shaped containers with identical weights can be used, which are distinguished for the customer by the pictorial information they bear.

Preferably the identification means is designed to send out a start signal, which frees the valve mechanism for filling the container when the container is oriented in a predetermined position with respect to the filling mechanism. As a result, it can no longer happen that the dispensed drink misses a carelessly positioned container, and this result is achieved with no need for complicated adjustment mechanisms to ensure that the container is correctly positioned.

Preferably a manually actuatable start switch is provided to send out a start signal that allows a filling process to begin.

Thus the customer has the feeling that he is still "master of the situation", and is not startled by a sudden beginning of the dispensing process.

The filling mechanism is preferably so constructed that it can simultaneously dispense the foodstuff into two (or even more) containers, in which case the identification means is designed to send out position signals and the filling mechanism is controlled in such a way that it can fill two (or more) containers, depending on how many are present. Hence a stressed-out father collecting the obligatory cola for his three children need no longer organize three filling processes, but instead can complete his task in a single step. The otherwise complicated actuation of various switches on the dispensing device is entirely eliminated.

Preferably the identification means comprises a sensor to detect the state of filling, by way of which it is possible to adjust a maximal level to which the particular container can be filled with the foodstuff. In this way it is ensured that any attempt to put an excessive amount of the desired drink into an unsuitable container is prevented. As a result, the manager of the establishment cannot be cheated, and furthermore an overflow catastrophe is ruled out, as is the likelihood that the drink will slop over during the subsequent transport.

Preferably a learning means is provided, with a manually actuatable controller for dispensing the foodstuff into a container and storing in memory the amounts dispensed and/or data regarding the state of filling in dependence on an identification signal. Thus the manager is not confined to particular containers provided by the manufacturer of the dispensing device, but instead can work with his own supply of dishes and adjust the dispensing device to the dishes with respect to the amounts of foodstuffs to be put into them. Preferably a (where appropriate, an additional) learning means is provided for inputting specification data for a specified foodstuff in dependence on an identification signal, so that the manager merely places the container intended for use with a particular foodstuff into the dispensing device, in the same way as a customer does, and selects or programs in the corresponding foodstuff. The learning means (or an additional learning means) is preferably furthermore designed so that various containers can be presented consecutively to the sensor arrangement, for detection of the shape characteristics, and/or to the weight-measuring means, so that the shape-characteristic/weight combination associated with a particular container can be specified. Then, for example, an "identification code" can be assigned to each container, which (likewise by way of the learning means) can be linked to a particular specification regarding filling amount and kind of drink. Thus when desired, it is possible quite simply to assign the same contents to different types of container in the establishment's collection, for instance because it has become impossible to obtain replacements for a particular type.

Another advantage derives from the means of detecting shape/weight in accordance with the invention, inasmuch as a given set of sensors can be used for various purposes. Firstly, the sensors can determine the correct position of the container during filling, secondly they can measure the state of filling, and thirdly they can identify the type of container.

BRIEF DESCRIPTION OF THE SEVERAL VIEWS OF THE DRAWINGS

In the following an example of the invention is explained in greater detail with reference to the accompanying drawings.

DETAILED DESCRIPTION OF THE INVENTION

Figure 1:
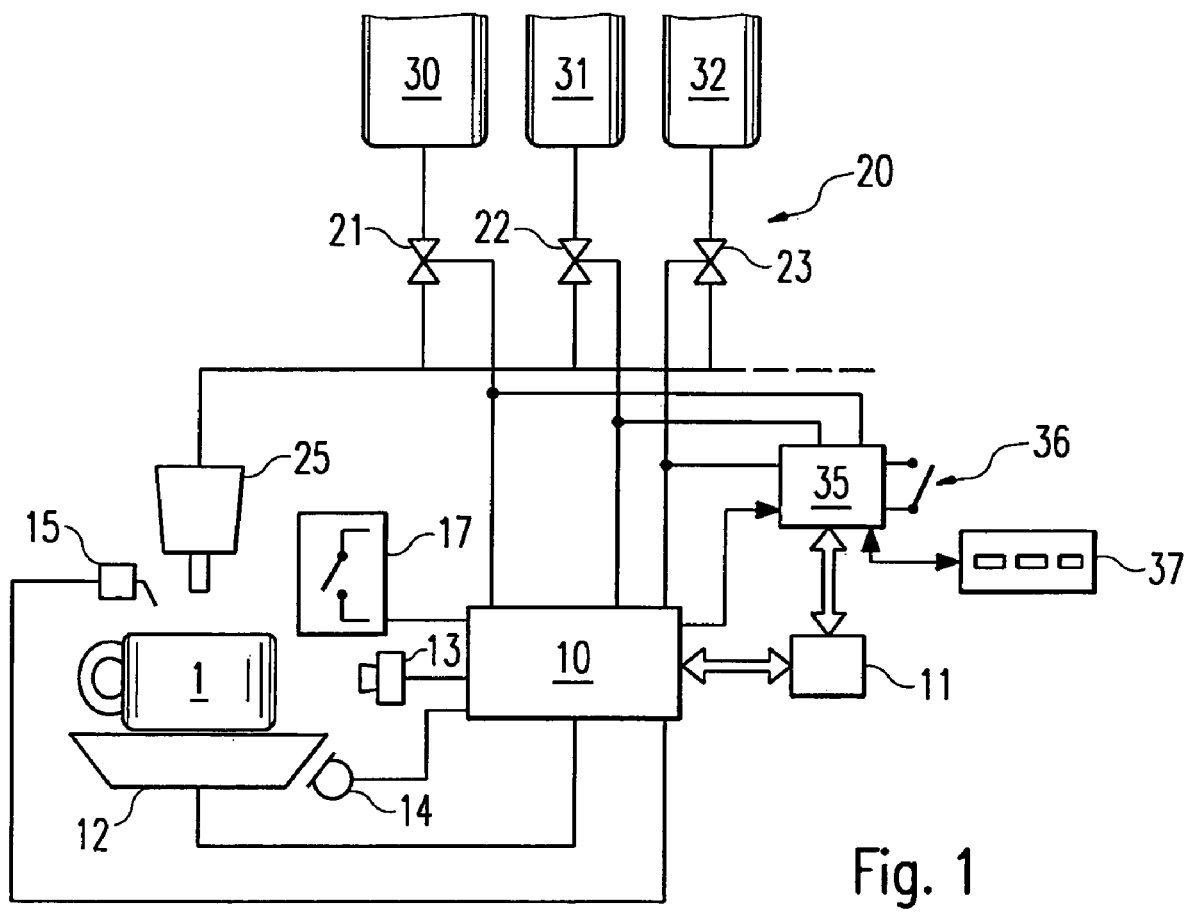
FIG. 1 is a schematic drawing of an embodiment of the dispensing device in accordance with the invention.

In the following description, the same reference numerals are used for identical parts or parts with identical actions.

FIG. 1 shows a dispensing device in which a container 1 is standing on a weighing scale 12 positioned below a filling mechanism 25 such that a foodstuff flowing out of the filling mechanism 25 will enter the container. The scale 12 is connected to an identification means 10 to which it signals the measured weight; in addition to the weight signal, the identification means 10 also receives output signals from an optical identification device 13, e.g. a camera, a code reader 14 and a filling-state sensor 15. The camera 13 can be used in such a way that in the identification means 10 the position of the container 1 is specified simultaneously with its shape characteristics, to ensure that the foodstuff emerging from the filling mechanism 25 actually enters the container 1. When the identification means 10 determines, on the basis of the sensor signals it receives, which container is standing under the filling mechanism 25 and whether the container is also correctly positioned, it generates a release signal for valve mechanism 20, which by way of individual valves 21, 22 and 23 with supply means 30, 31 and 32 are connected upstream and downstream to the filling mechanism 25. This release signal is blocked, however, until the customer actuates a start switch 17. It is only after this start signal has been given that the container 1 is filled by the filling mechanism 25.

Furthermore, a memory 11 is connected to the identification means 10 in such a way that in response to the identification signals, which are derived from the signals sent out by the sensors 12 to 14, a selection of the foodstuff associated with the container that has been presented is made, and the amount of foodstuff is specified. If, for example, the supply means 30 delivers espresso and the supply means 31 delivers milk, depending on which particular container 1 has been chosen either only espresso will be dispensed or a mixture of espresso and milk, the latter for a cappuccino or a latte macchiato. This decision is made in the identification means 10 on the basis of the data stored in the memory 11.

In the embodiment of the invention shown in FIG. 1 a learning means 35 with a keyboard 37 is also provided, which in addition comprises a switch 30 (which of course can also be disposed in the keyboard 37). By means of this learning means 35 the manager can place a container 1, which has been specially selected by the manager but otherwise has not been characterized in any particular way, into the dispensing device as a customer would, but assign to the identification signals generated in the identification means 10 certain kinds of information, in particular the nature and amount of the foodstuff that is to be dispensed. During this procedure he can use the switch 36 to control the valve mechanism 20 so that the amount of foodstuff he has specified is put into the container. He can also prespecify a maximal amount, which is sensed by the filling-state sensor 15.

Figure 2:
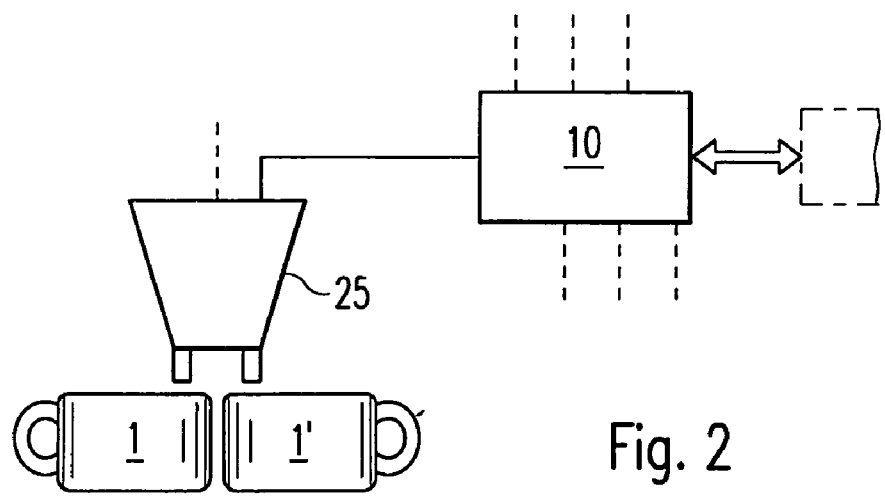
FIG. 2 shows a part of FIG. 1 with a filling mechanism modified for the simultaneous filling of several containers.

In FIG. 2 is shown a dispensing device with a filling mechanism 25 constructed for simultaneous dispensing into two (identical) containers 1 and 1'. The previously described sensors in FIG. 1, in particular the optical detection device 13, are also provided here, so that in response to an corresponding identification signal the identification means 10 actuates both outlets of the filling mechanism 25 when two containers have been placed below them, and actuates only one outlet (the correct one, of course) when only a single container is positioned under the filling mechanism 25.

It will be evident from the above that the invention can also be employed when a coffee machine provided with the necessary technical devices is operated in the manner in accordance with the invention. The invention thus also comprises a particular method for the operation of a dispensing device.

LIST OF REFERENCE NUMERALS

1 Container
10 Identification means
11 Memory
12 Weighing scale
13 Camera
14 Code reader
15 Filling-state sensor
17 Start switch
20 Valve mechanism
21 1st valve
22 2nd valve
23 3rd valve
25 Filling mechanism
30 Supply means
31 Supply means
32 Supply means
35 Learning means
36 Switch
37 Keyboard

The invention claimed is:

1. Dispensing device for drinks or similar dosable liquid foodstuffs comprising:
    a plurality of supply means for supplying a specific foodstuff or a mixture of specific foodstuffs;
    a filling mechanism for filling a container with a predetermined amount of a specified foodstuff or mixture of foodstuffs;
    identification means comprising at least one shape sensor sensing and detecting shape characteristics of containers that differ from one another and at least one weight sensor detecting weight of the containers that differ from one another but that are all filled with a foodstuff for subsequent consumption from the container, wherein the identification means generates an identification signal based on the shape and weight detected by the at least one shape sensor and the at least one weight sensor that specifies the container detected;
    a programmable memory, wherein at least one of amount signals and choice signals corresponding to the identification signal are stored, for specifying the foodstuffs;
    a valve mechanism in communication with the identification means, wherein the identification signal actuates the valve mechanism to put at least one of the supply means in communication with the filling mechanism, wherein the filling mechanism fills the container with a predetermined amount of the specified foodstuff or mixture of foodstuffs; and
    learning means with a manually actuatable dispensing control dispensing a foodstuff into a container, wherein data is stored in the memory relating to at least one of the amount and state of filling in dependence on the identification signal; wherein the learning means enters specification data into the device for a specific foodstuff assigned to the identification signal.

2. Dispensing device according to claim 1, wherein the identification means comprises reading means to read information attached to the container.

3. Dispensing device according to claim 1, wherein the identification means is adapted to send out a start signal, which releases the valve mechanism for filling the container when the container is in a predetermined position with respect to the filling mechanism.

4. Dispensing device according to claim 1, wherein a manually actuatable start switch is provided to send out a start signal that causes a filling process to begin.

5. Dispensing device according to claim 1, wherein the filling mechanism is adapted to fill simultaneously two containers with the specified foodstuff, the identification means is designed to send out position signals, and the filling mechanism is controlled so that either one or two containers are filled, depending on how many are present.

6. Dispensing device according to claim 1, wherein the shape sensor comprises an optical sensor.

7. Dispensing device for drinks or similar dosable liquid foodstuffs comprising:
    a plurality of supply means for supplying a specific foodstuff or a mixture of specific foodstuffs;
    a filling mechanism for filling a container with a predetermined amount of a specified foodstuff or mixture of foodstuffs;
    identification means comprising at least one shape sensor automatically sensing and detecting shape characteristics of containers that differ from one another and at least one weight sensor automatically detecting weight of the containers that differ from one another but that are all filled with a foodstuff for subsequent consumption from the container, wherein the identification means generates an identification signal that specifies a container detected by the at least one shape sensor and the at least one weight sensor; and
    a valve mechanism in communication with the identification means, wherein the identification signal actuates the valves mechanism to put at least one of the supply means in communication with the filling mechanism, wherein the filling mechanism fills the container with a predetermined amount of the specified foodstuff or mixture of foodstuffs;
    wherein the identification means comprise a filling-state sensor to specify a maximum filling state to which the container is to be filled with the specified foodstuff or mixture of foodstuffs.

* * * * *